US008775783B2

(12) United States Patent
Streuter et al.

(10) Patent No.: US 8,775,783 B2
(45) Date of Patent: Jul. 8, 2014

(54) METHOD AND APPARATUS FOR CREATING A SELF BOOTING OPERATING SYSTEM IMAGE BACKUP ON AN EXTERNAL USB HARD DISK DRIVE THAT IS CAPABLE OF PERFORMING A COMPLETE RESTORE TO AN INTERNAL SYSTEM DISK

(75) Inventors: Gary W. Streuter, San Clemente, CA (US); Randy Deetz, Costa Mesa, CA (US); James Sedin, Ketchum, ID (US)

(73) Assignee: CMS Products, Inc., Costa Mesa, CA (US)

( * ) Notice: Subject to any disclaimer, the term of this patent is extended or adjusted under 35 U.S.C. 154(b) by 0 days.

(21) Appl. No.: 13/242,545

(22) Filed: Sep. 23, 2011

(65) Prior Publication Data
US 2012/0072398 A1    Mar. 22, 2012

Related U.S. Application Data

(63) Continuation of application No. 12/500,525, filed on Jul. 9, 2009, now Pat. No. 8,028,158.

(60) Provisional application No. 61/079,786, filed on Jul. 10, 2008.

(51) Int. Cl.
*G06F 9/00* (2006.01)
*G06F 11/00* (2006.01)
*G06F 9/455* (2006.01)

(52) U.S. Cl.
USPC ................................ 713/2; 714/15; 703/24

(58) Field of Classification Search
USPC ............................................................ 713/2
See application file for complete search history.

(56) References Cited

U.S. PATENT DOCUMENTS

| | | | |
|---|---|---|---|
| 5,854,905 A | 12/1998 | Garney | |
| 6,205,527 B1 * | 3/2001 | Goshey et al. | 711/162 |
| 6,347,397 B1 * | 2/2002 | Curtis | 717/170 |
| 6,477,629 B1 * | 11/2002 | Goshey et al. | 711/162 |
| 6,553,432 B1 | 4/2003 | Critz et al. | |
| 6,751,592 B1 | 6/2004 | Shiga | |
| 6,931,558 B1 * | 8/2005 | Jeffe et al. | 713/340 |
| 7,073,013 B2 | 7/2006 | Lasser | |
| 7,089,449 B1 * | 8/2006 | Cluff et al. | 714/15 |
| 7,293,166 B2 | 11/2007 | Nguyen et al. | |
| 7,743,241 B1 * | 6/2010 | Moore | 713/2 |
| 7,818,160 B2 * | 10/2010 | Collins et al. | 703/24 |
| 7,822,595 B2 * | 10/2010 | Brunet et al. | 703/23 |
| 7,899,662 B2 * | 3/2011 | Brunet et al. | 703/24 |
| 7,945,751 B2 * | 5/2011 | Garapati et al. | 711/162 |
| 2005/0198485 A1 | 9/2005 | Nguyen et al. | |
| 2005/0246583 A1 | 11/2005 | Robinson | |
| 2006/0190941 A1 | 8/2006 | Kobayashi et al. | |

(Continued)

OTHER PUBLICATIONS

"Moving an existing Windows installation to a Removable USB drive". Niall Douglas, Feb. 2007.
2 "XP booting direct from USB", May 1, 2005, various authors D. Bare-metal restore, Wikipedia.com, Date and author unknown.

(Continued)

*Primary Examiner* — Suresh Suryawanshi
(74) *Attorney, Agent, or Firm* — Law Office of Scott C. Harris, Inc.

(57) ABSTRACT

Backup applications that use externally connected hard disk drives for storing full image backups of a windows system disk or compressed image or file by file backups of a windows system disk. A system incrementally updates the images, including the system registry, and puts information on the external drive that makes it bootable.

9 Claims, 2 Drawing Sheets

(56) References Cited

U.S. PATENT DOCUMENTS

2006/0198485 A1 9/2006 Binderbauer
2006/0206702 A1 9/2006 Fausak
2006/0224794 A1 10/2006 Stevens
2007/0136568 A1 6/2007 Ding

OTHER PUBLICATIONS

611073424 Strueter; Gary—Jun. 2007—Method and apparatus for locking an external storage disk drive whereby the 1 password is encrypted with the same algorithm as used by the system BIOS with the intent of securing software D backups.

* cited by examiner

METHOD AND APPARATUS FOR CREATING A SELF BOOTING OPERATING SYSTEM IMAGE BACKUP ON AN EXTERNAL USB HARD DISK DRIVE THAT IS CAPABLE OF PERFORMING A COMPLETE RESTORE TO AN INTERNAL SYSTEM DISK

This application claims priority from application No. 61/079,786, filed Jul. 10, 2008, the entire contents of the disclosure of which is herewith incorporated by reference.

BACKGROUND

1. Field of the Invention

The present invention relates generally to software utilities for backup of operating system hard disk drives and bare metal restore.

2. Description of Prior Art

Prior art exists that relates to making external USB attached hard disk drives bootable under various operating systems, including Windows.

Some of the art requires a person very skilled in computers, using a manual procedure(s) that may or may not work. Much of the prior art contains some element of folklore that may or may not allow an external disk to be bootable on all systems.

nedprod.com contains instructions that could help a person to construct a bootable USB drive.

911cd dotnet is a forum of experimenters who have had varying amounts of success in creating bootable USB drives.

Published patent application 20070136568 describes a methodology similar to that found on nedprod.com. 20070136568 Ding illustrates creating a bootable drive that will boot when a person skilled in the art changes the boot order of the computer system bios. 20070136568 illustrates booting an external USB drive to the point of a DOS prompt. It does not describe how a Graphical Users Interface (GUI) operating system can be executed. 20070136568 Ding will not allow the user to launch programs using a mouse point and click.

SUMMARY OF THE INVENTION

Embodiments describe a software method to create a fully bootable copy of a windows system disk. The bootable copy is created onto a bus connected external hard disk drive. The external disk drive can be booted such that the software that created the backup can be used to fully restore the system disk to a new internal disk in the event the original system disk has crashed physically or the software on the system disk is rendered unusable.

Embodiments also describe allowing the user to boot and run other software applications from the external drive until such a time as the user can execute the restore application.

An embodiment describes creating bootable external hard disk drives that will, after changing the boot order of the computer system bios, boot to the Windows GUI interface. These allow the user to select and execute a restore application that will image the bootable external drive over a corrupted or newly installed system drive.

BRIEF DESCRIPTION OF THE DRAWINGS

Embodiments of the present invention are illustrated by way of example, and not by way of limitation. The following figures and the descriptions both brief and the detailed descriptions of the invention refer to similar elements and in which.

DETAILED DESCRIPTION

An embodiment addresses issues of accessibility when an attached storage device is used for backing up a Windows system drive without the use of bootable CDs or DVDs having to be used for the purpose of restoring the system to an existing corrupted system drive or a fresh unformatted system drive.

This process is often referred to in the literature as "bare metal restore". Bare Metal Restore is referenced in Wikipedia. The present system allows new functionality that is not possible with previous systems of this type.

An embodiment also allows a user to execute other applications to access data prior to the restore operation being performed and also allows the user to replace a corrupted or physically incapacitated internal system drive with the USB external bootable drive.

Figure 1:
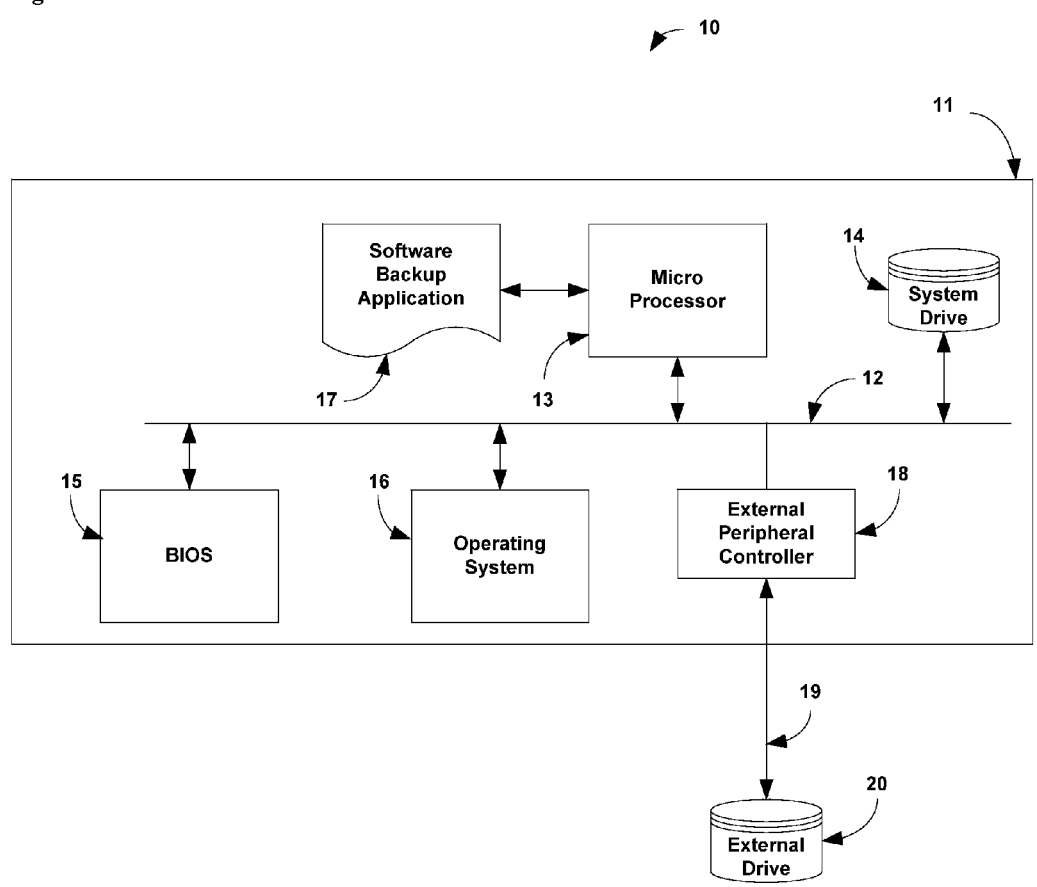
FIG. 1 depicts an embodiment showing a computer system with an external disk drive.

FIG. 1 shows an embodiment 10 including a computer system 11. Computer system 11 has microprocessor 13 connected to internal bus 12. BIOS (basic input/output system) 15 includes a set of software used by microprocessor 13 for determining which data source contains the operating system that will be executed. BIOS 15 also contains a text based user interface application that can be invoked at boot time by the user to specify the order in which drives are examined for an operating system. Typically BIOS 15 will direct microprocessor to first attempt booting an operating system from system drive 14. During the boot process, microprocessor 13 will transfer operating system 16 from system drive 14 to system memory 20, then transfer control to operating system 16. At some later point, the user selects software backup application 17 for execution. This causes operating system 16 to transfer software backup application 17 from system drive 14 to system memory 20 where it will be executed by microprocessor 13.

Software backup application 17 contains special logic as described in the embodiments. In the first embodiment of the invention, software backup application 17 transfers an image of the system drive to external drive 20 via internal bus 12, external peripheral controller 18, and external bus 19. Software backup application 17 makes changes to the copy of the operating system registry and to other portions of external drive 20 so as to make external drive 20 bootable over external USB bus 19.

Software backup application 17 is executed either by the user or on a cyclic schedule to locate and transfer recently changed or altered files including system registry files residing on system drive 14 to external drive 20. This action is more commonly referred to as an incremental backup. In the first embodiment, software backup application 17 makes changes after every incremental backup to the copy of the operating system registry and to other portions of external drive 20 so as to make external drive 20 bootable over external USB bus 19.

In another embodiment of the invention, software backup application 17 will make the alterations to the system registry and other portions of system drive 14 that would have normally be made to external drive 20. This embodiment of the invention alleviates the requirement for software backup application 17 to make changes after every incremental backup to the copy of the operating system registry and to other portions of external drive 20 as described in the portions of the prior art so as to make external drive 20 bootable over external USB bus 19.

In another embodiment of the invention, software backup application 17 will be continuously running in the background. In this embodiment of the invention, software backup application 17 will, when a file in use by operating system 16 or by another software application is closed, immediately transfer a copy of the file to external drive 20 effectively backing up the file. If the embodiment of the invention had previously made changes to the system registry and other portions of system drive 14 as described in the portions of the prior art, no other changes to the copy of the system registry residing on external drive 20 will be made. If the action of closing the file resulted in a change to the system registry residing on system drive 14, a copy of the system registry residing on system drive 14 will be transferred to external drive 20 ensuring that external drive 20 will be bootable and complete in the event system drive 14 fails and the user needs to boot external drive 20 to effect a restore of system drive 14 or needs to boot external drive 20 to access data or applications residing on external drive 20.

Figure 2:
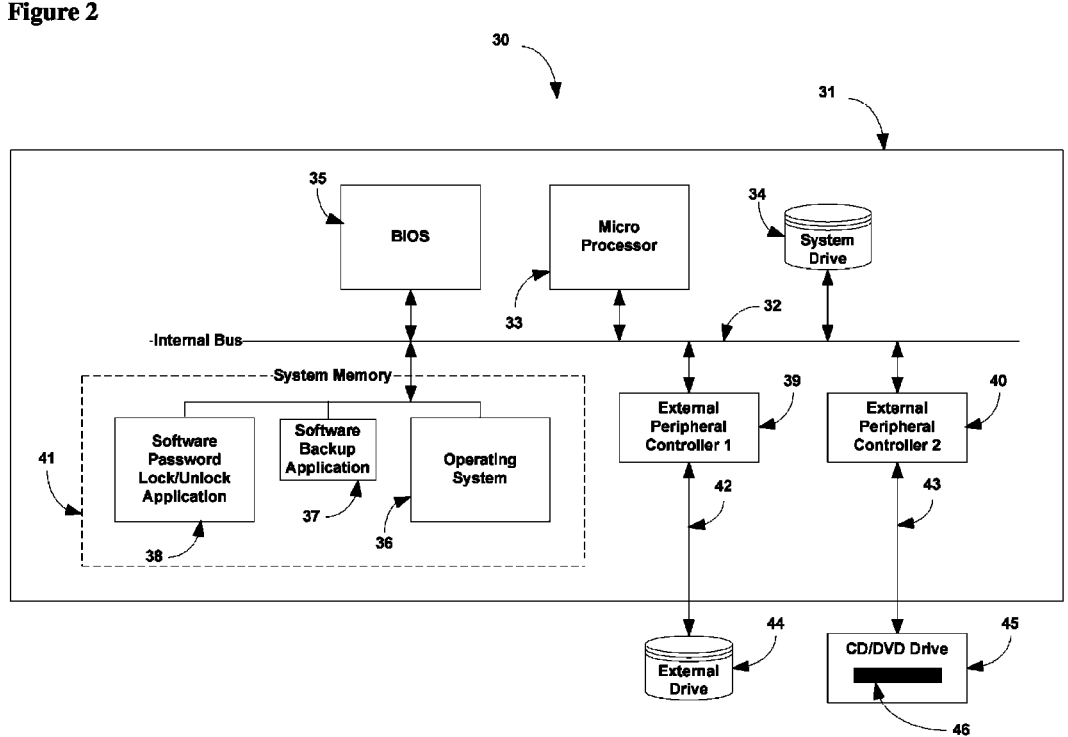
FIG. 2 depicts the invention and computer system with an external disk drive with a bootable image of the system drive and an external CD/DVD drive used to boot from a CD/DVD diskette.

Now referencing FIG. 2 depicting an embodiment of the invention that makes reference to patent application number patent application Ser. No. 12/487,377, filed Jun. 18, 2009.

This embodiment of the invention is a representation where 30 depicts computer system 31 as used according to an embodiment. Computer system 31 has microprocessor 33 connected to internal bus 32. BIOS (basic input/output system) 35 contains a set of software used by microprocessor 33 for determining which hard disk drive contains the operating system that will be executed. BIOS 35 also contains a text based user interface application that can be invoked at boot time by the user to specify the order in which drives are examined for an operating system. Typically BIOS 35 will direct microprocessor to first attempt booting an operating system from system drive 34. During the boot process microprocessor 33 transfers operating system 37 from system drive 34 to system memory 41, then transfers control to operating system 36. In this embodiment of the invention there are two software applications running. Software password lock/unlock application 38 secures external drive 44 and Software backup application 37 backs up system drive 34 onto external drive 44. Software Password lock/unlock application 38 initially prompts the user for a password that will be used to lock external drive 44. Software Password lock/unlock application 38 will encrypt or obfuscate the password using the same algorithm as used by BIOS 35 when BIOS 35 is used to lock or unlock system drive 34. Software Password lock/unlock application 38 will, under normal operations, ensure that external drive 44 is always locked. When software backup application 37 is initiated by the user or automatically according to a schedule, software backup application will notify software password lock/unlock application 38 to unlock external drive 44. Once software password lock/unlock application 38 has unlocked external drive 44 and notified software backup application 37 that external drive 44 is unlocked, software backup application 37 will backup system drive 34. Once system drive 34 is backed up, software backup application 37 will notify software password lock/unlock application 38 to lock external drive 44.

In another embodiment of the invention the algorithms used by Software Password lock/unlock application 38 to lock and unlock external drive 44 are native inside software backup application 37. In this embodiment of the invention, software backup application will lock and unlock external drive 44. In the event system drive 34 becomes unusable and external drive 44 is password locked, BIOS 35 will not be able to unlock external drive 44. In this embodiment of the invention, the user will insert CD/DVD diskette 46 into CD/DVD drive 45. CD/DVD diskette contains a copy of operating system 36 and software password lock/unlock application 38 and software backup application 37. The user will use the text based user interface of BIOS 35 to reset the boot order of computer system 31 such that BIOS 35 will first attempt to load an operating system from CD/DVD drive 45. Once operating system 36 has been loaded and is being executed by microprocessor 33, it will be directed by the user to load software backup application 37 and software password lock/unlock application 38. software password lock/unlock application 38 will query the user for the password to unlock external drive 44. Once external drive 44 has been unlocked, the user will use the text based user interface of BIOS 35 to reset the boot order of computer system 31 such that BIOS 35 will first attempt to load an operating system from external drive 44 which is now unlocked. Once computer system 31 has been booted from external drive 44, operating system 36 will load software backup application 37. The user can now use software backup application 37 to restore system drive 34 or can use other applications on external drive 44 to access his data. In another embodiment of the invention, the operating system residing on CD/DVD diskette 46 may be any of a plurality of operating systems such as Linux, Windows, or any other operating system capable of being loaded from a CD/DVD drive connected over a plurality of buses such as USB, IEEE-1394, or external SATA. In this embodiment of the invention, software backup application 37 and password lock/unlock software application will be compatible with the operating system currently on CD/DVD diskette 46 and may not be compatible with the version of the operating system residing on external drive 44 or system drive 34. In another embodiment of the invention, external drive 44 and CD/DVD drive 45 may both be connected to external peripheral controller 1 39.

The present application describes a computer system with a system BIOS; an operating system that operates according to a system registry;

at least one internal storage unit, storing plural user files;

at least one externally attached storage unit, over a computer-controlled bus; and a first software application program, running on said computer system, that selectively formats said external storage unit; copies each of the files from said internal storage unit to said external storage unit; and forms a system registry on said external storage unit such that said external storage unit is bootable over said computer controlled bus. The first software application program repairs said operating system residing on said internal storage unit when said first software application program is corrupted and will not boot. The system registry on the external storage unit operates when said external storage unit is booted and formats said internal storage unit thus making said internal hard storage bootable with all files that were copied from said internal storage unit.

The repairs can comprise first changing a setting to boot from said external storage unit, formatting said internal hard storage unit, copying, file by file, the files from said external hard storage unit to said internal hard storage unit and rendering said internal hard storage unit bootable; and after said copying, changing said setting such that said internal hard storage unit is booted.

The soft ware application detects changes to contents on said internal hard storage unit, creates a bootable file by file image of said internal hard storage unit onto said external hard storage unit, when the user attaches said external hard storage unit to a second computer system, allows said external storage unit will be booted as the system hard storage unit, and after booting, said first software application creates a bootable file by file image of said external hard storage unit onto said second computer's internal storage unit. The software application allows file backup onto internal hard storage units of multiple computer systems for the purpose of updating software and/or data files on said multiple computer system.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other forms of lighting devices can be used.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer system, comprising:
a computer system with:
a system BIOS;
at least one main computer file storage unit, storing plural user files including an operating system that operates according to a system registry;
at least one backup computer file storage unit, connected over a computer-controlled bus; and
said computer system operating to execute a first software application program and a second software application program;
said second software application program will:
initially prompt a user for a password that will be used to lock said backup computer file storage unit; and
said second software application program will encrypt or obfuscate said password and save said password such that it can be retrieved and used without prompting a user for said password a second time; and
normally maintain said backup computer file storage unit as locked in a way that requires said password to unlock said backup computer file storage unit;
said first software application program will initially be activated by a user or automatically launched after its initial activation according to a schedule, and
notify said second software application program to unlock said backup computer file storage unit; and
once said second software application program has unlocked said backup computer file storage unit, said first software application program will backup said main computer file storage unit by copying plural files from said main to said backup computer file storage unit as part of a backup operation which copies plural files from said main computer file storage unit to said backup computer file storage unit, and
once all files have been copied from said main computer file storage unit to said backup computer file storage unit, said first software application program will notify said second software application to lock said backup file storage unit, and
said second software application program will when requested from said first software application program lock said backup computer file storage unit; and
said second software application program will, based on detecting information indicative of a failure in said main computer file storage unit, carry out an operation to allow a user to boot from said backup computer file storage unit by unlocking said backup computer file storage unit in the case of a failure in said main computer file storage unit.

2. A system as in claim 1, wherein said at least one main computer file storage unit and at least one backup computer file storage unit are hard disk drives.

3. A system as in claim 1, wherein said second software application program initially requests a password from a user, receives said password from said user, encrypts said password and saves said password and retrieves said encrypted password and decrypts said encrypted password prior to use said password to unlock said backup computer file storage unit.

4. A system as in claim 3, wherein said backup computer file storage unit includes an executable version of all files from the main computer file storage unit including a current copy of the system registry.

5. The system as in claim 4, further comprising an unlock routine on an external medium that can be used to unlock said backup computer file storage unit.

6. A method of operating a computer for backup with a locked drive on a computer comprising:
storing plural user files including an operating system that operates according to a system registry on a computer at least one main computer file storage unit;
operating the computer by executing said operating system, and changing said user files;
operating the computer to back up said at least one main computer file storage unit to at least one backup computer file storage unit, where said at least one backup computer file storage unit is connected to said computer over a computer-controlled bus; and
using the computer for maintaining said backup computer file storage unit as locked in a way that requires a password to unlock the backup computer file storage unit, said password being a password previously entered by the operator and saved and retrieved and used to unlock said backup computer file storage unit when user files are to be backed up;
using the computer for automatically unlocking said backup computer file storage unit by retrieving said previously stored password and applying said password to said backup computer file storage unit and then copying said files to the backup computer file storage unit as part of a backup operation which copies plural files from said main computer file storage unit to said backup computer file storage unit;
using the computer for automatically locking said backup computer file storage unit after said plural files have been copied; and
based on detecting information indicative of a failure in said main computer file storage unit, the computer carrying out an operation to allow a user to boot from said backup computer file storage unit by unlocking said backup computer file storage unit in case of a failure in said main computer file storage unit, wherein said first software application program initially requests a password from a user, receives said password from said user, encrypts said password and saves encrypted password and retrieves said encrypted password and decrypts said encrypted password prior to using said password to unlock said backup computer file storage unit.

7. A method as in claim 6, wherein said backup computer file storage unit includes an executable version of all files from the main computer file storage unit including a current copy of the system registry.

8. A method as in claim 7, wherein said software application automatically unlocks said backup computer file storage unit to allow booting from said backup computer file storage unit upon detecting said failure in said main computer file storage unit.

9. The method as in claim 8, further comprising an unlock routine on an external medium that can be used to unlock said backup computer file storage unit.

* * * * *